(12) United States Patent
Rußlies et al.

(10) Patent No.: US 7,941,795 B2
(45) Date of Patent: May 10, 2011

(54) SYSTEM FOR UPDATING AND OUTPUTTING SPEECH DATA

(75) Inventors: Lars Rußlies, Hamburg (DE); Joachim Wietzke, Karldruhe (DE); Andreas Lehmann, Hamburg (DE)

(73) Assignee: Herman Becker Automotive Systems GmbH, Karlsbad (DE)

( * ) Notice: Subject to any disclaimer, the term of this patent is extended or adjusted under 35 U.S.C. 154(b) by 1192 days.

(21) Appl. No.: 10/840,934

(22) Filed: May 7, 2004

(65) Prior Publication Data
US 2005/0010420 A1    Jan. 13, 2005

(30) Foreign Application Priority Data
May 7, 2003   (EP) .................................. 03010306

(51) Int. Cl.
G06F 9/44 (2006.01)
G10L 13/00 (2006.01)
G01C 21/00 (2006.01)
G01C 21/30 (2006.01)

(52) U.S. Cl. ........ 717/168; 717/169; 717/170; 704/258; 704/260; 704/275; 701/200; 701/210

(58) Field of Classification Search .................. 704/260, 704/258, 275; 717/168, 169, 170; 701/200, 701/210; 707/203
See application file for complete search history.

(56) References Cited

U.S. PATENT DOCUMENTS

| | | | |
|---|---|---|---|
| 5,406,492 A | 4/1995 | Suzuki | |
| 5,579,509 A * | 11/1996 | Furtney et al. | 703/27 |
| 5,613,101 A * | 3/1997 | Lillich | 709/230 |
| 5,799,264 A | 8/1998 | Mizutani et al. | |
| 5,915,238 A * | 6/1999 | Tjaden | 704/260 |
| 6,157,910 A * | 12/2000 | Ortega | 704/231 |
| 6,249,764 B1 * | 6/2001 | Kamae et al. | 704/275 |
| 6,345,250 B1 | 2/2002 | Martin | |
| 6,496,974 B1 * | 12/2002 | Sliger et al. | 717/106 |
| 6,505,161 B1 * | 1/2003 | Brems | 704/270 |
| 6,546,369 B1 * | 4/2003 | Buth et al. | 704/275 |

(Continued)

FOREIGN PATENT DOCUMENTS

EP    0 901 000 A2    3/1999

OTHER PUBLICATIONS

European Search Report for corresponding application No. EP 03 01 0306, dated Sep. 25, 2003, 11 pages.

*Primary Examiner* — James S Wozniak
*Assistant Examiner* — Paras Shah (57) ABSTRACT

A system for outputting speech from speech data that may include an application, an internal speech data module, and an external speech data module is provided. The internal speech module stores default speech data that defines which speech data is compatible with the application. The external speech module, which may include a data carrier, may provide optional speech data, including a sequence identifier, separately from the application. To determine whether optional speech data fits the application, the application generates a sequence of one or more segment designators designating speech segments, and associating with them a sequence identifier. The application may also compare the sequence identifier generated by the application with that of the optional speech data. If a predetermined result occurs, the optional speech data may be used. Otherwise, the default speech data may be used. This method may be used to update default speech data with optional speech data.

12 Claims, 6 Drawing Sheets

U.S. PATENT DOCUMENTS

| | | | |
|---|---|---|---|
| 6,658,659 B2 * | 12/2003 | Hiller et al. | 717/166 |
| 7,178,142 B2 * | 2/2007 | Bennett et al. | 717/168 |
| 7,346,435 B2 * | 3/2008 | Amendola et al. | 701/1 |
| 7,350,207 B2 * | 3/2008 | Fisher | 717/178 |
| 2002/0120491 A1 * | 8/2002 | Nelson | 705/10 |
| 2002/0184002 A1 | 12/2002 | Galli | |
| 2002/0188449 A1 * | 12/2002 | Nukaga et al. | 704/258 |
| 2002/0193996 A1 * | 12/2002 | Squibbs et al. | 704/260 |
| 2003/0028380 A1 | 2/2003 | Freeland et al. | |
| 2003/0159135 A1 * | 8/2003 | Hiller et al. | 717/166 |
| 2003/0177485 A1 * | 9/2003 | Waldin et al. | 717/169 |
| 2007/0226273 A1 * | 9/2007 | Rath et al. | 707/203 |

* cited by examiner

PLSE TURN LEFT AT NEXT SIDE STRT    3, 1
⎵
20

PLSE TURN LEFT AT NEXT SDS    2, 1
⎵
21

| AT | "at" |
|---|---|
| INST | "Please insert" |
| LFT | "left" |
| MAIN | "main" |
| NAVCD | "navigation CD" |
| NEXT | "next" |
| PLSE | "please" |
| RGT | "right" |
| SIDS | "side" |
| THY | "Thank you" |
| TURN | "turn" |
| ⋮ | ⋮ |

SYSTEM FOR UPDATING AND OUTPUTTING SPEECH DATA

PRIORITY CLAIM

This application claims priority under 35 U.S.C. §119 to European Patent Application No. 03010306.3, filed May 7, 2003. The disclosure of the above application is incorporated herein by reference.

BACKGROUND OF THE INVENTION

1. Technical Field

This invention relates to a system for outputting speech. The system includes methods and apparatuses for outputting speech, methods for updating speech, and a data carrier including speech data.

2. Related Art

When interfacing with a user, various applications increasingly use speech output. For example, speech output may be used when the attention of a user, particularly the visual attention, should not be distracted by an optical interface. A typical example of an application that should not distract the user is a car navigation system, which directs the driver to a predetermined target. While driving, the driver should carefully watch the traffic situation around him, rather than a visual interface from a car navigation system. Thus, speech output as an acoustical interface is desirable in this situation.

A conventional method of providing speech output as an interface between an application and a user may be explained with reference to FIG. 7. While performing its main task, an application may come to a point where a certain output to a user is desired. For example, during startup a car navigation system may determine that a required data CD (including, for example, navigation data) is missing. Thus it may be desirable for the navigation system to output a message conveying that the data CD should be inserted. Modern systems for speech output generally provide a list of speech segments (which may be thought of as sound files) that may be strung together in various ways to form various messages. These speech segments may be of any size depending on criteria such as: data quantity, software complexity, speech driver complexity and the like.

Figure 7:
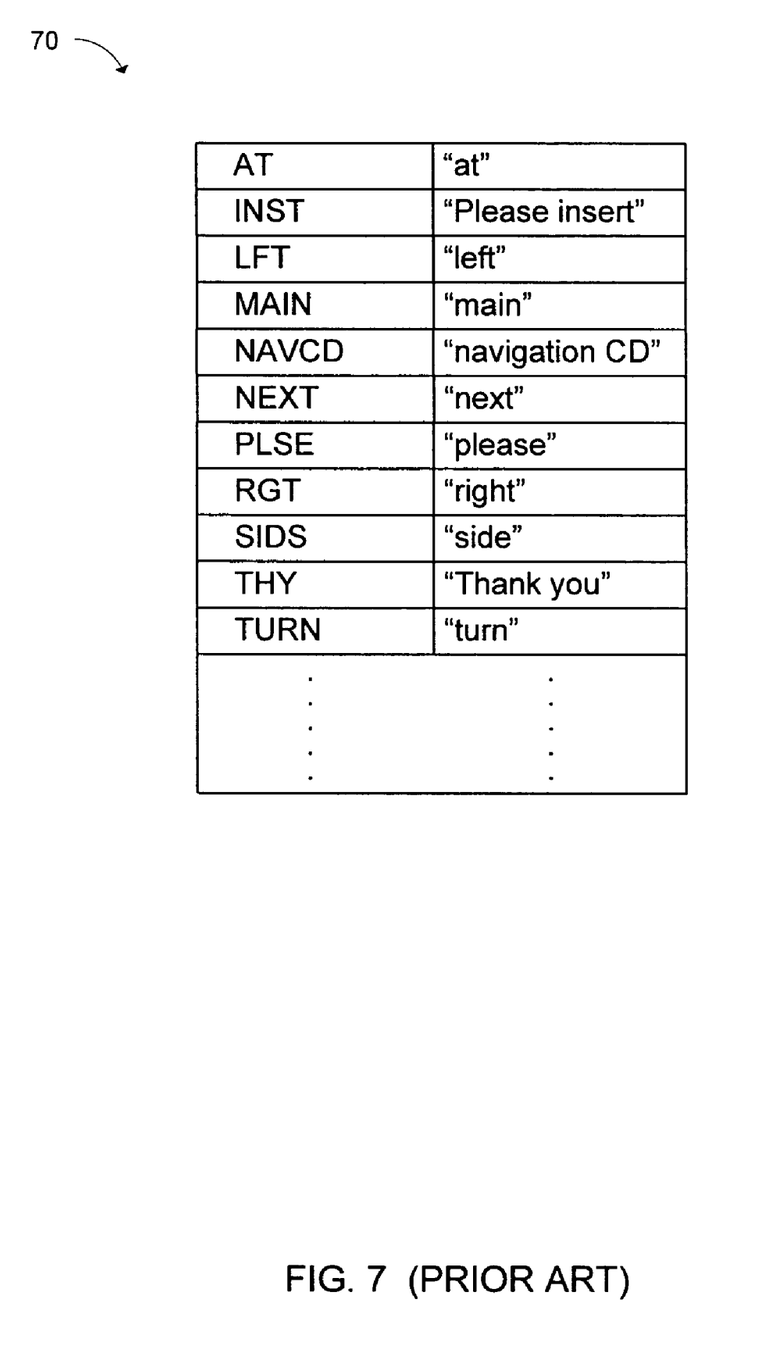
FIG. 7 shows prior art speech data.

FIG. 7 shows a table 70 including speech segments in the right-hand column and segment designators in the left-hand column. Each segment designator identifies a particular speech segment. In order to create a desired output speech, an application, such as a navigation system, would need to have knowledge of the contents of the table 70. Assuming such knowledge, the application would produce a sequence of segment designators, and take from the table 70, the respective speech segments to compose the desired speech output. For example, the navigation system or a speech driver of the navigation system may compose the designator sequence INST NAVCD. This would reference the two speech segments "Please insert" and "navigation CD" in table 70, thus creating the sentence "Please insert navigation CD." In another example, the navigation system might determine that the driver needs to turn left at the next side street in order to reach his destination. The navigation system or its speech driver may, for example, output the sequence of designators PLSE TURN LFT AT NEXT SIDS. This would reference the respective speech segments in table 70 to create the sentence "Please turn left at the next side street." Generally, the data in table 70 is usually provided together with the application program and/or together with application-related data such as, navigation data.

SUMMARY

There is an increasing demand for providing speech data separately from a main application, such as executable software or other potentially expensive data. The need for this separate provision may due to a technical requirement (for example, improvement in the sound quality), or a non-technical rationale. For example, a user of an application might wish to have the speech output of the application provided by the voice of a particular famous actor, and would be willing to pay for speech data generated by the voice. The user however, may not be willing to repurchase the entire application just to obtain such speech data. If speech data are provided separately from main application and its corresponding data, particularly from the main application executable, compatibility problems may arise when the main application software changes in a manner that requires different and/or additional speech data.

A method is presented for outputting speech to a user of an application. In general, the application generates, with reference to speech data, data relating to speech output in accordance with requirements of the application. Particularly, the application generates a series of one or more segment designators that designate speech segments to define the speech. The application further associates the series of one or more segment designators with a sequence identifier, such as a required-speech-data-identifier ("RSDI"). In addition, speech data are provided. The speech data may be provided via a speech data module that is provided separately from the main application, and therefore may be referred to as "optional speech data." The optional speech data may include speech segments associated with and designated by segment designators. These segment designators may be defined by a sequence identifier such as an actual-speech-data-identifier (ASDI). In general, the sequence identifiers RSDI and ASDI identify speech data. In addition, the sequence identifiers provide information that may be used to determine the compatibility of speech data with a particular application or other speech data. To determine compatibility, the sequence identifier created by the application and that identifying the optional speech segments, RSDI and ASDI, respectively, may be compared with each other to generate a result. The speech is created according to either the RSDI or the ASDI in accordance with the result.

The term "speech data" generally refers to a plurality of speech segments and their associated segment designators, all of which are identified by a sequence identifier, such as an ASDI. A speech segment may include a piece or segment of speech that is handled as a non-dividable unit when creating speech. The sequence identifier, roughly speaking, identifies the version of the speech data. In general, the number of speech segments in the speech data should be sufficient to cover all the speech output requirements of an application generating the speech output. Thus, speech data in may be thought of as a set of speech segments, from which all speech outputs required by the application may be provided by appropriately combining the individual speech segments.

Different speech data may be provided, namely default speech data (for example, a male voice and a female voice), and optional speech data (for example, the speech provided by the voice of a famous actor). The default speech data is generally that which is supplied with an application, and may generally be assumed to fit or be compatible with the needs of the application. Therefore, the sequence identifier of the default speech data may be assumed to represent speech data that will fit the requirements of the application. In contrast, the optional speech data, as described above, may be provided separately from the application and may not fit the requirements of the application. Thus, the optional speech data need a sequence identifier so that compatibility with the application may be determined. However, the default speech data do not necessarily need such an identifier if it is otherwise ensured that they fit to the requirements of the application. In order to determine if optional speech data is compatible with a given application, the sequence of the identifier of the default and optional speech data are compared and if the comparison yields a predetermined result, the optional speech data may be used. Otherwise the default speech data may be used.

Associating a sequence identifier, such as a RSDI, with a sequence of one or more segment designators may generally include a provision ensuring that information about the required speech data is provided for a sequence of segment designators. This may be accomplished by firmly adding specific numbers, characters, or data to the sequence of segment designators. It may also be accomplished much more loosely, for example, by providing the application with a priori knowledge regarding the software version from which the sequence of segment designators was generated. In this case, it is not necessary to "physically attach" the sequence identifier to the sequence of segment designators.

Because software development may lead to new versions of the application software, it is desirable for speech data to be compatible with the various versions of the application. Compatibility may be accomplished by developing later versions of speech data that differ from earlier speech data only in that the later speech data include additional speech segments are added, but no speech segments are deleted. This leads to a downward compatibility of speech data in a sense that later created speech data are compatible with earlier distributed speech data (and the software fitting the earlier distributed speech data). However, as software development proceeds the need to completely restructure speech output may arise. For example, the need to completely restructure the speech output may arise when the amount of data associated with an increasing number of larger speech segments gets larger. Therefore, to reduce the amount of data associated with the speech segments, a higher number of smaller speech segments may be used. However, using a higher number of smaller speech segments may result in the later assembled speech data being no longer compatible with earlier speech data. Thus, to identify this type of incompatibility, the sequence identifiers and the structure around the sequence identifiers may include information about compatibility and non-compatibility of the speech data with different development lines of speech data and software.

The speech data, including the optional speech data, are configured in a data structure. This data structure may be implemented on a data carrier. The data structure generally includes speech data that includes a first storage region for storing a plurality of speech segments associated with segment designators, and a second storage region for storing an sequence identifier, such as an ASDI, that provides information about the relationship of the speech data to earlier and/or later and/or possible other speech data and applications using speech data.

The methods for outputting speech data may also be used as the basis for methods of updating speech data. In general, the methods for updating speech data may be used to add to or replace default speech data with optional speech data. Methods for updating speech data generally include determining the compatibility of the optional speech data with the default speech data using the previously described methods. Additionally, if the optional speech data is found to be compatible, it may be added to the default speech data or a list of acceptable speech data. Alternately, the optional speech data may replace the default speech data. If however, the optional speech data is not found to be compatible, it generally will not be added or used to replace the default speech data.

A speech output system, which provides speech output to a user (particularly as an interface to the user) may include an application that generates data relating to speech output. More particularly, the application may generate a sequence of one or more speech segment designators, a sequence identifier (such as an RSDI) and associates the sequence identifier with the sequence of speech segment designators so that the sequence identifier identifies the sequence of speech segments. Further, the apparatus may include a comparator for comparing the sequence identifier created by the application with the sequence identifier of the optional speech data. The apparatus may further include a speech driver for creating speech with reference to either the sequence identifier created by the application with the sequence identifier of the optional speech data, depending on the result of the comparison. More specifically, if the comparator renders a predetermined result, then the optional speech data may be used for creating speech. Otherwise, the default speech data may be used.

The speech output system may be implemented as part of a vehicle navigation system. In this implementation, the application may include navigation software that generates messages from to a user, such as the driver of a vehicle, which are output acoustically by synthesized speech in accordance with requirements and results of the navigation software. The synthesized messages may include input prompts or informational outputs. In parallel with speech output, a visual output may be provided, for example, readable text messages, map displays, or the like.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention.

DETAILED DESCRIPTION OF THE PREFERRED EMBODIMENTS

Figure 1:
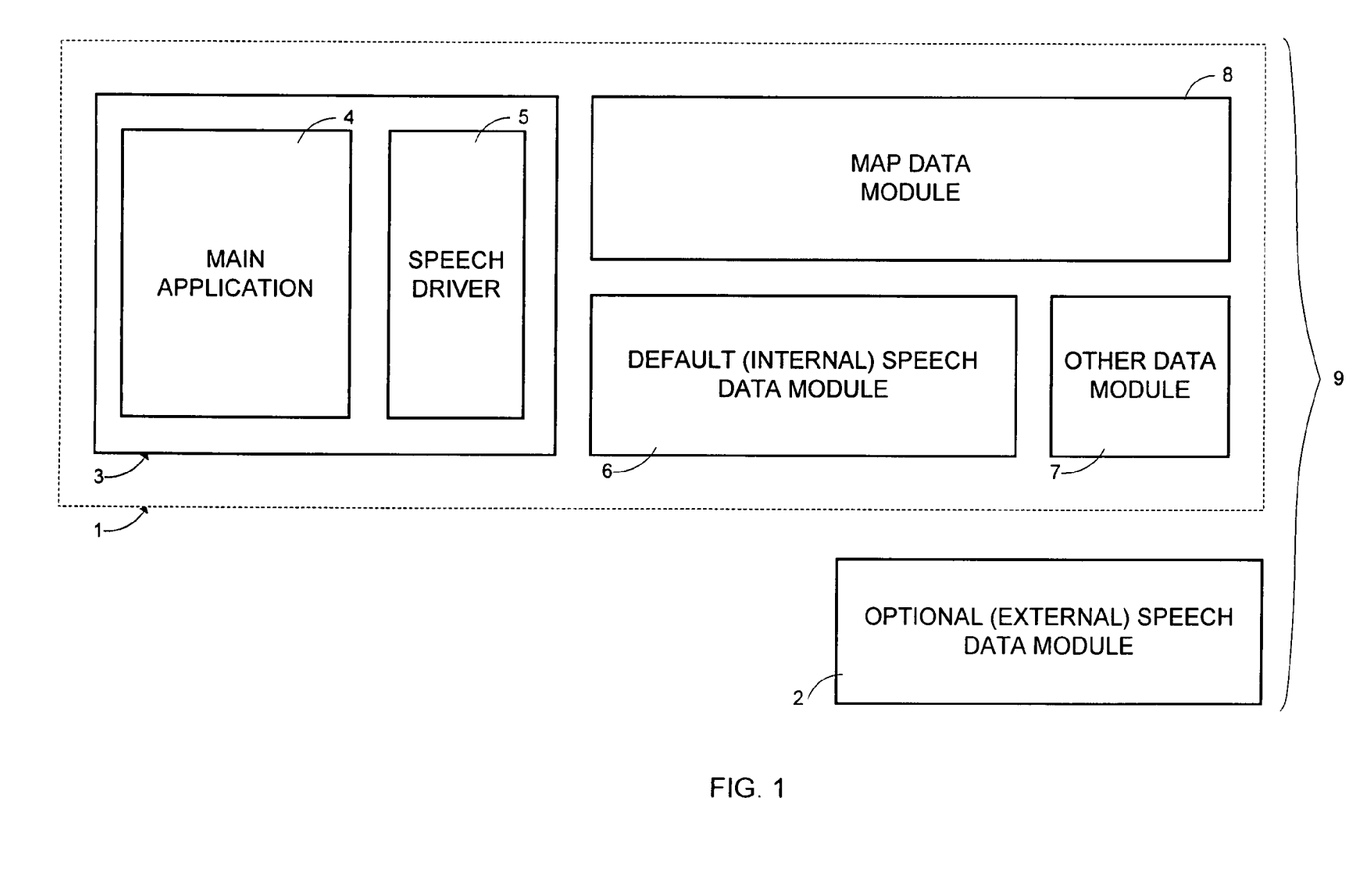
FIG. 1 is a block diagram of a speech output system.

An example of a speech output system is shown in FIG. 1. The speech output system 9 includes a package 1 and an optional (external) speech data module 2. The package 1 may come as a unit, such as a collection of files on a data carrier.

The package 1 may include a software part 3 that includes executables, and data modules 6, 7, 8 for storing application-related information. The software part 3 may include a main application 4 for performing the primary tasks of the application, and a speech driver 5 for generating speech output. For example, if the main application 4 is a navigation application, it may perform tasks such as: position finding, route finding and the like and the data modules may include: a map data module 8 and an other data module 7. However, their may be any number and type of data modules depending on the nature of the main application. In addition the map data module 8 and the other data module 7, a default speech data module 6 may be provided. The default speech data module is generally provided with the main application and, therefore, may be considered internal to the package 1. The default or internal speech data module 6 may include default speech data that are fully adapted to the needs of the main application. The package 1, by itself is ready for use. Without anything further, the speech driver 5 would use the default speech data module 6 for generating speech output.

Speech data for modern car navigation applications have a relatively small data volume that is generally lower than 1 MB. This is far less than the volume of other data such as map data 8. The default speech data module 6 may include more than one set of default speech data. These parallel sets of default speech data may be selectable by the user. For example, default speech data having speech segments from a female voice may be provided in parallel to default speech data having speech segments from a male voice. The driver may select either of these default speech data. In this context, the speech content in parallel sets of speech data is the same. However, the voice may be different, or ambient sounds may be provided or suppressed, or the like.

Each set of default speech data may include a sequence identifier. The sequence identifier for default speech data is referred to as a "required-speech-data-identifier" or "RSDI." In general, the RSDI associated with a default speech data identifies that default speech data. In addition, the RSDI provides information that can be used to determine whether other speech data sets are compatible with an application supplied with the default data. Because it can be assumed that the default speech data is compatible with the application with which it was supplied, the RSDI of the default speech data may be used to define the application's speech data requirements.

The speech output system 9 may further include an optional speech data module 2 that includes optional speech data. The optional speech data module 9 may be provided separately from the default speech data module 6, and therefore, may be considered external to the package 1. For example, the optional speech data module 2 may include a data file downloaded from the internet, through a wireless network, or provided on a separate disk or compact disk ("CD"). Because the optional speech data module 2 may be supplied separately from the package 1, it is possible that the structure and content of the optional speech data may not fully match the needs of the main application. This problem is exacerbated if the main application is under development resulting in new releases of the main application with new software options and new speech output requirements.

To determine whether the optional speech data provided on an optional speech data module 2 fits the needs of the main application 4, the optional speech data may include a sequence identifier that identifies the optional speech data. The sequence identifier may also include information from which as determination regarding whether the quantity and/or quality of the optional speech data fit the needs of the main application 4 can be made. In other words, the sequence identifier for the optional speech data enables the application to determine if the optional speech data is compatible. The sequence identifier for optional speech data may be referred to as an "actual-speech-data-identifier" or "ASDI." In general, if the optional speech data fits the needs of the main application, the optional speech data will be used. However, if the optional speech data does not fit, the default speech data will be used.

Figure 2:
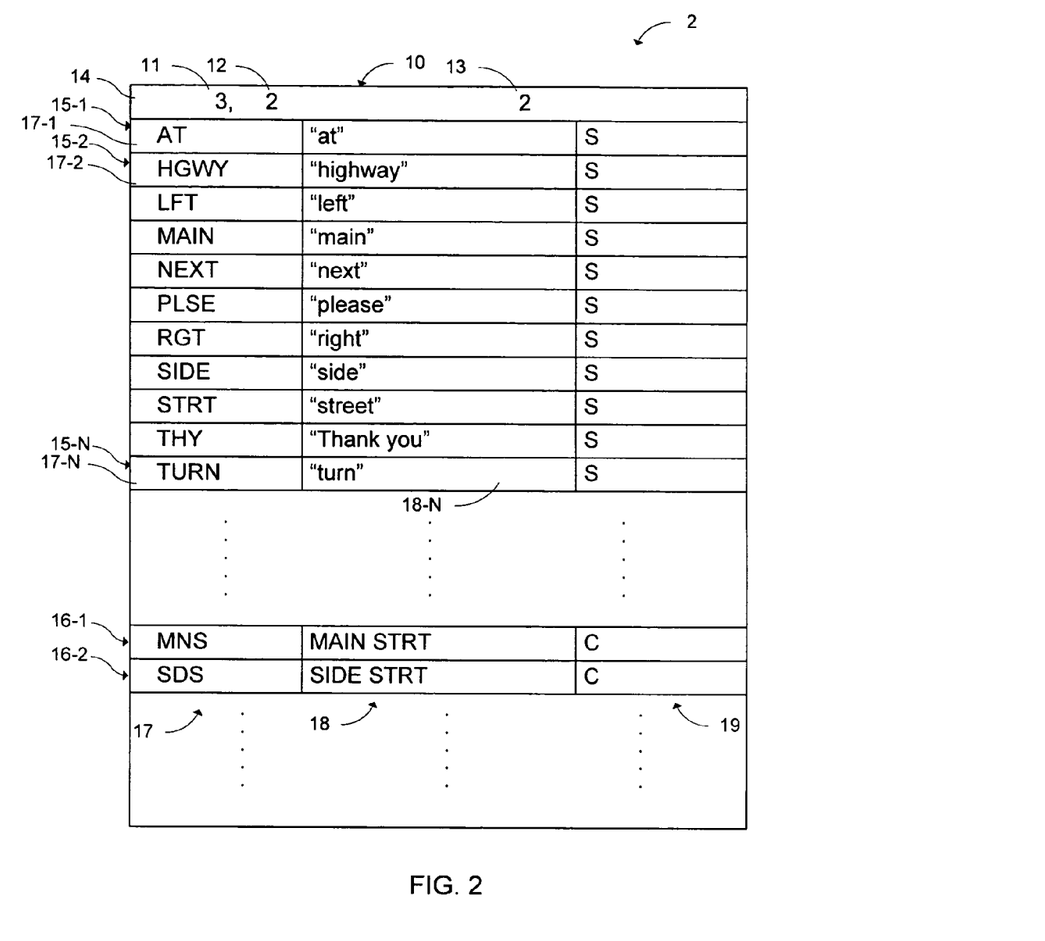
FIG. 2 is a block diagram of a speech data structure.

An example of the structure of the optional speech data is shown in FIG. 2. The structure of the optional speech data 2 may be represented by a table 10. The table 10 includes an identifier section 14 and speech entries 15. The table 10 may also include a column for composition lists 19, which will be discussed below. The table 10 may also include composition list entries 16. Each speech entry 15 includes at least a specific speech segment 18-1, 18-2, . . . , 18-n, (collectively 18). In FIG. 2 these speech segments are represented by written words. Alternately, the speech segments may be sound files or pointers (address pointers) to sound files, which may be utilized for composing speech. For example, in a table structured according to FIG. 2, instead of the entry "highway," the speech segment may include a pointer to a sound file, where the sound file produces the spoken word "highway" when played by an appropriate program.

The speech segments 18-1, 18-2, . . . , 18-n are associated with corresponding segment designators 17-n, which are shown in column 17. The segment designators 17-n are generally known to the main application or its speech driver and may be used by the main application or its speech driver for composing speech. The main application (4 in FIG. 1) or its speech driver (5 in FIG. 1) uses the segment designators to produce a sequence of speech designators that are then used to access the related speech segments and the related sound files to compose speech ready for output. The segment designators 17-1, 17-2, . . . , 17-n may resemble a type of mnemonic code and may be found explicitly in every speech entry 15. Alternatively, numbers may be used as segment designators or the segment designator may simply be an address or an address offset from a basic address indicating the storage location of the respective speech segment 18-n (a pointer to a sound file or the sound file itself).

Therefore, the speech output system of FIG. 1 may synthesize speech according to the following procedure. The main application 4 or its speech driver 5 may produce a sequence of segment designators in order to access the optional speech data in the optional speech data module 6. The optional speech data may have the data structure of FIG. 2 and include the segment designators, which can be used by the speech output system of FIG. 1 to retrieve the respective sound files and deliver them in an appropriate sequence and timing to an appropriate player.

Figure 4:
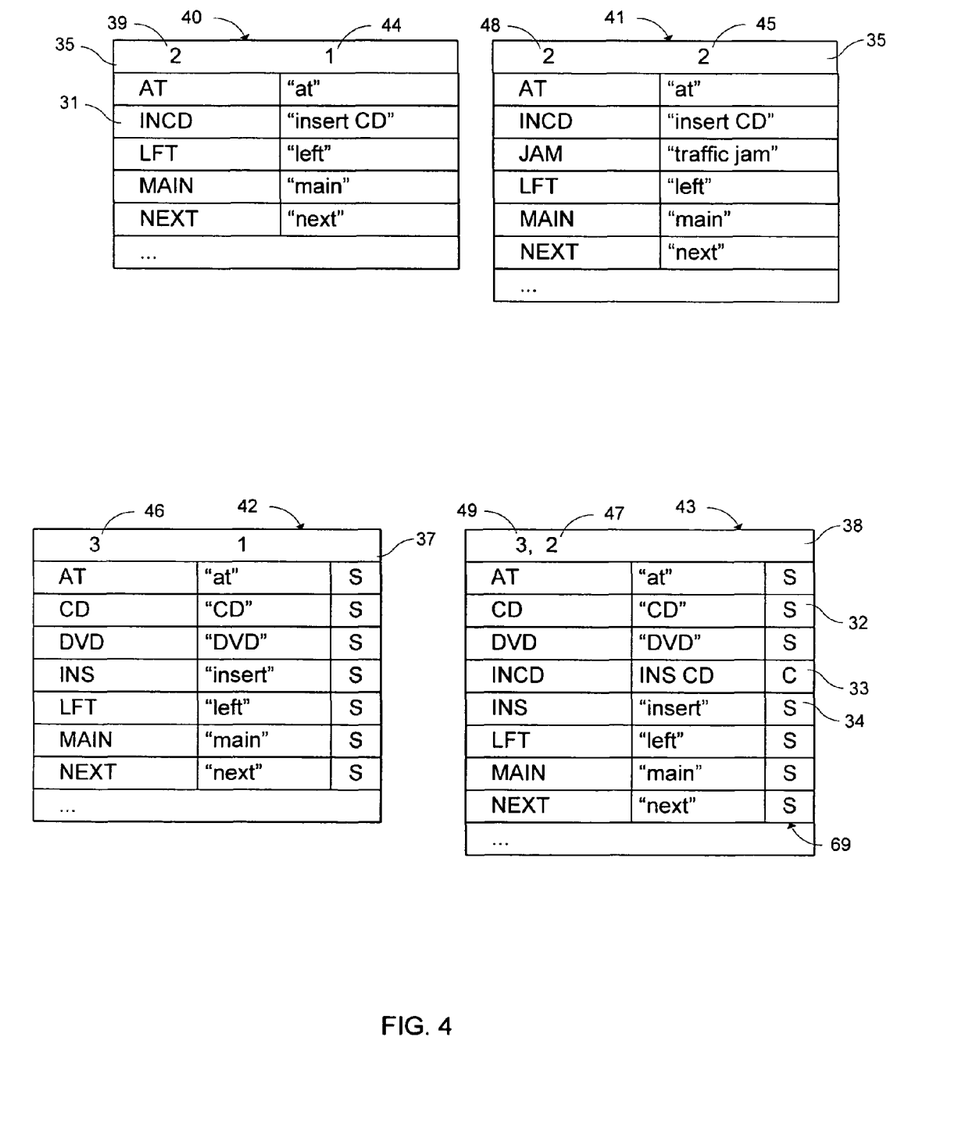
FIG. 4 is a block diagram of a speech data structure as it evolves.

In order to explain the function and structure of the identifier section, an example of evolving speech data is shown in FIG. 4. FIG. 4 shows four similar sound data 40, 41, 42, and 43. For purposes of this example, it is assumed that they were created in six-month increments in the order of their numbering. Usually, in this situation, new speech data can be fully used only by new application software. In order to use speech data to its full extent, it is generally necessary for the application software to have a priori knowledge about the speech data, particularly the available elements, which may be known to the application by their segment designators.

The earliest created sound data 40 includes examples of the speech data entries and their respective speech segments, which are needed for composing messages. Although only a few entries are shown, many more entries may be included.

After sound data 40, sound data 41 was released to accommodate a new functionality added to the main application software. The new functionality includes detecting a traffic jam, recalculating the traveling route, and giving a related message to the driver, such as "Because of traffic jam your traveling route was recalculated and changed." In order to output this message, the word "traffic jam" is needed. Therefore it was added to sound data 41 and accordingly constitutes a new entry in the speech data. The only difference between sound data 40 and sound data 41 is the addition of a new entry. The existing entries remained unchanged. Therefore, older applications (for example, software using speech data 40) will also be able to use speech data 41 because all entries required by the application software behind speech data 40 can also be found in speech data 41. This means that the speech data are downward compatible.

If speech data 41 includes new default speech data, it would generally be released only when new software becomes available. However, the new speech data may include optional speech data, in the sense that it is not shipped with the application software. Thus, from a user's point of view, optional speech data 41 may be presented to a speech output system, such as a navigation system that includes an older version of the application software (for which speech data 40 were created). Nevertheless, this older application may be able to fully use speech data 41, because all entries in speech data 40 can also be found in speech data 41. In addition, the reverse situation may also arise. In this situation, a user may attempt to offer the older speech data 40 to a new application. For example, the new application may be designed to use the newer speech data 41. In this case, problems may arise because the newer application may attempt to output the word "traffic jam," which is not available in the older optional speech data 40. Therefore, the optional speech data 40 cannot be used and the default speech data released with the newer software is generally used.

In order to determine if a particular version of speech data is compatible with a particular application, the identifier section of the optional speech data may contain a version identifier. For example, speech data 40 includes an identifier section 35 that includes a version identifier 44, which is equal to 1. Similarly, speech data 41 includes an identifier section 35 that includes a version identifier 2, which is equal to 2. In the example shown in FIG. 4, the version identifier increases from 1 in speech data 40 to 2 in speech data 41. The version identifier allows the application to determine if a given software data version is compatible with its requirements. Generally, the application may check the version identifier of optional speech data, and if the version identifier identifies a version equal to or younger than that required by the application, the optional speech data may be used. However, if the version identifier of the optional speech data identifies a version newer than that required by the application, the default speech data would be used. For example, if the application were released with speech data 40, the application would require a version identifier of one or lower. Before using newer speech data 41, the application would check the version identifier number 45 of the newer speech data 41. Likewise, an application released with speech data 41 would require and check for a version identifier number of two or higher and would use optional speech data satisfying this requirement. Otherwise, the application would use the default speech data. Utilizing the version identifier as described above allows the application to determine that the accessed speech data may be compatible.

Another mechanism for changing speech data is exemplified in the transition from speech data 40 (or 41) to speech data 42. In this case, complete structural changes were performed in that not all the entries of the older speech data 40 (or 41) are included in the new speech data 42. This transition may arise when, for example, the option of receiving map data from a DVD instead of from a CD was added in the transmission from an application to a newer application. To support this new option, the speech output was refined so that the former prompting message "insert CD" enabled by a single entry in speech data 40 is broken up into two entries "insert" and "CD" and the entry "DVD" is added in speech data 42. The entries in speech data 42 are each separately addressable by individual segment designators. This enables the system to compose the appropriate message depending on whether the system is equipped with a CD drive or a DVD drive. The transition from speech data 40 to 42 has the advantage that overall data quantity is reduced. However, it has the disadvantage that the new speech data 42 are no longer compatible with the former speech data 40 or 41. In order to detect this situation, a root identifier may be provided in the identifier section of the speech data. In this example, speech data 40 includes a root identifier 39, speech data 41 includes root identifier 48, and speech data 42 includes root identifier 46. In the transition from speech data 40 (or 41) to 42 the root identifier changed from 2 to 3 (this assumes that an earlier, not shown root exists). When application software accesses speech data, it may check the root identifier for compatibility. Only those speech data with an identical root identifier can be used. Optional speech data with a different root identifier cannot be used. For example, an application fitting with speech data 40 would not find the entry "INCD" in speech data 42, and the software fitting with speech data 42 would not find the entry "DVD" in speech data 40. Thus, the speech data mutually do not fit, which demonstrates why the root identifiers need to be identical. Therefore, the software fitting with speech data 42 checks the root identifier for identity to number 2, and may use optional speech data if it has such a root identifier. Otherwise, the application may use the default speech data.

It is possible to use root identifiers and version identifiers in combination. Thus, the identifier section may have two entries, namely a root identifier and a version identifier. In this case, an application will check the version identifier of optional speech data to determine if the version identifier is identical to or larger than the version required by the application. The application will also check the root identifier of the optional speech data to determine if it is identical to that required by the application. If both these conditions are met, the optional speech data may be used. Otherwise, the default speech data may be used. In a more general sense, the actual-speech-data-identifier (such as that shown in FIG. 2 and indicated by reference number 12) may include a component that enables an application to detect the compatibility of speech data in a downwardly compatible line of speech data, and a component for detecting non-compatible lines of speech data.

Speech data may also include composition lists, an example of which is shown in FIG. 4 (see also FIG. 2, reference number 19). Composition lists may be used in the situation where it is desirable to create newer speech data that may be used by software requiring older roots. For example, it may be desirable to maintain in speech data 43 the capability of producing the speech designated by the segment designator INCD 31 in speech data 40. This may be accomplished using composition lists, an example of which is shown in speech data 43. Speech data 43 also has a segment designator 33 for INCD. However, segment designator 33 does not have a speech segment (a possibly voluminous sound file) associated with it. Rather, segment designator 33 includes a list of other segment designators 34, 32 in speech data 43, which do have speech segments associated with them. This list of other segment designator is referred to as a "composition list." The segment designators indicated in the composition list are used to retrieve and combine their associated sound files in order to create the desired speech output. In this example, the composition list 33 includes segment designators INS and CD, which have entries 32 and 34 in speech data 43. One advantage of composition lists is that they require only a small data volume. The segment designators of composition lists may be alphabetically sorted in the speech data, as shown in FIG. 4, or they may be provided separately, as shown as entries 16 in FIG. 2. Column 19 in FIG. 2 and the right hand columns in speech data 42 and 43 of FIG. 4 include a discriminator that distinguishes between speech segment entries ("S") and composition list entries ("C"). Discriminators may be provided if it is not otherwise possible to distinguish composition lists and speech entries properly.

Referring to FIG. 1, the speech driver 5 of the application software 3 generally needs to be able to handle composition lists. For speech segment entries, the speech driver may, for example, obtain the address of a specific sound file. In comparison, for a composition list, the speech driver would obtain two or more other segment designators, which would be used to access speech data in order to retrieve the respective speech segments therefrom. By using composition lists, compatibility among speech data of different roots is also established. Accordingly, the root entry in the identifier section may have the entries of all those roots to which compatibility is given. Compatibility is given if all entries in the former speech data 40 are found in the newer speech data of another root, either by identity of entries, or by "mapping" them with composition lists.

Figure 3:
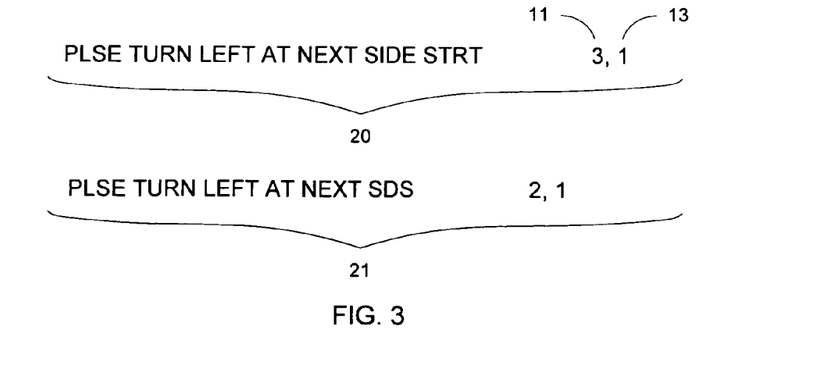
FIG. 3 is an output format of an application.

An example of an output format of a speech driver when a sequence of segment designators was generated is shown in FIG. 3. The example of FIG. 3 refers to the table in FIG. 2. The sequence shown in FIG. 3 has a sequence of segment designators leading to the output "Please turn left at next side street," was generated by a speech driver requiring a speech data of root 3, and a version of at least version 1. Thus, associated with that sequence of segment designators is a required-speech-data-identifier "3,1" that indicates that speech data of root 3 and at least version 1 are required. The speech driver would access the table in FIG. 2 with this required-speech-data-identifier and would determine that the actual-speech-data-identifier has an identical root identifier and a higher version identifier. Therefore, the speech data represented by the table of FIG. 2 may be used.

In contrast, output sequence created by an earlier version of speech data is shown in FIG. 3. The earlier version of speech data 21 is mostly identical to the version discussed in connection with FIG. 2, except that the earlier speech data 21 of FIG. 3 has a root 2, for which an immediate speech entry for "SDS" (namely "side street") existed. However, this immediate speech entry no longer exists in the version of FIG. 2 (which has a root 3). However, the table of FIG. 2 has a composition list for the former immediate speech entry SDS, and accordingly, the table of FIG. 2 may also produce root 2 outputs. Accordingly, the speech data of FIG. 2 has two entries "3,2" for the root identifier of its actual-speech-data-identifier. If a sequence as shown in FIG. 3B is to be processed, the root number 2 of the required-speech-data-identifier (coming from an older software) is compared with all entries in the identifier section of the speech data shown in FIG. 2. Because the root identifier in FIG. 2 includes root 2, the table can be used. The designator SDS would be composed by utilizing the composition list of the elements SIDE and STRT, the two designators existing as segment designators in the table.

Figure 5:
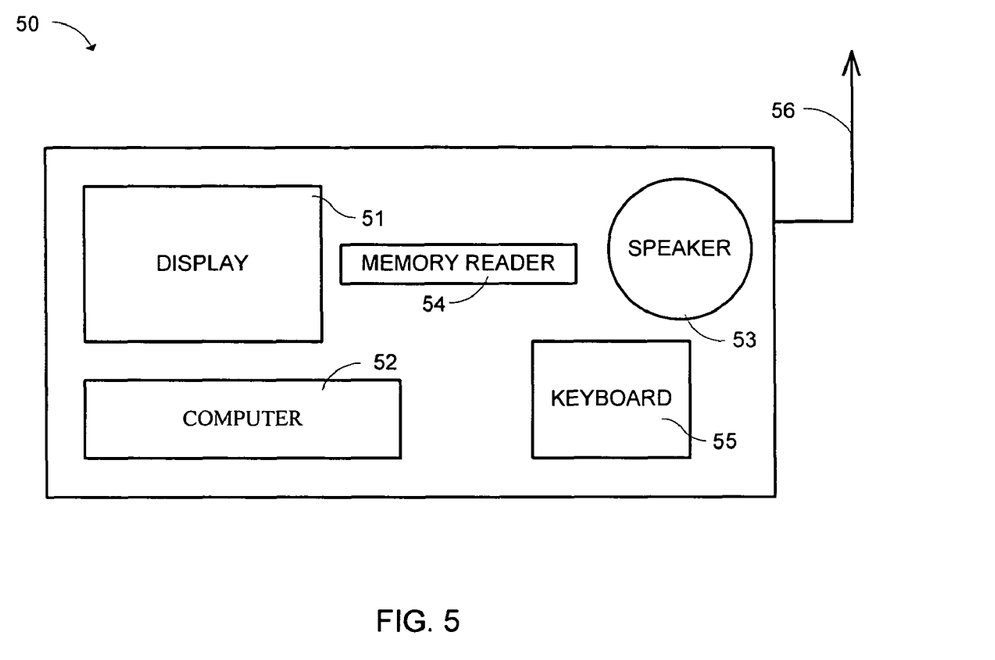
FIG. 5 is a block diagram of another speech output system.

Another example of a speech output system is shown in FIG. 5. The speech output system 50 generally includes a computer 52, an output speaker 53, and the elements shown in FIG. 1. The computer 52 may include a memory, such as a non-volatile memory or hard drive, onto which the elements of shown in FIG. 1 may be stored. The speech output system 50 may also include a memory reader 54 and/or an antenna 56, which may be used to load the elements of FIG. 1 onto the memory of the computer 52. The memory reader 54 may include a compact disk ("CD") or digital video disk ("DVD") reader, or other type of removable-storage media. The computer 52 may load an application or data modules from the CD/DVD or from the hard drive and may execute operations in accordance with the main application, and to output speech in any manner previously described. The speech output system may further include a visual display 51, such as a liquid crystal display ("LCD") screen or a cathode ray tube ("CRT") display. The visual display 51 may operate in parallel with the speaker 53. A keyboard and/or other input element 55 may also be provided. Because the speech output system 50 may include a navigation application, it may be a navigation system for a vehicle.

In contrast, output sequence created by an earlier version of speech data is shown in FIG. 3. The earlier version of speech data 21 is mostly identical to the version discussed in connection with FIG. 2, except that the earlier speech data 21 of FIG. 3 has a root 2, for which an immediate speech entry for "SDS" (namely "side street") existed. However, this immediate speech entry no longer exists in the version of FIG. 2 (which has a root 3). However, the table of FIG. 2 has a composition list for the former immediate speech entry SDS, and accordingly, the table of FIG. 2 may also produce root 2 outputs. Accordingly, the speech data of FIG. 2 has two entries "3,2" for the root identifier of its actual-speech-data-identifier. If a sequence as shown in FIG. 3 is to be processed, the root number 2 of the required-speech-data-identifier (coming from an older software) is compared with all entries in the identifier section of the speech data shown in FIG. 2. Because the root identifier in FIG. 2 includes root 2, the table can be used. The designator SDS would be composed by utilizing the composition list of the elements SIDE and STRT, the two designators existing as segment designators in the table.

Figure 6:
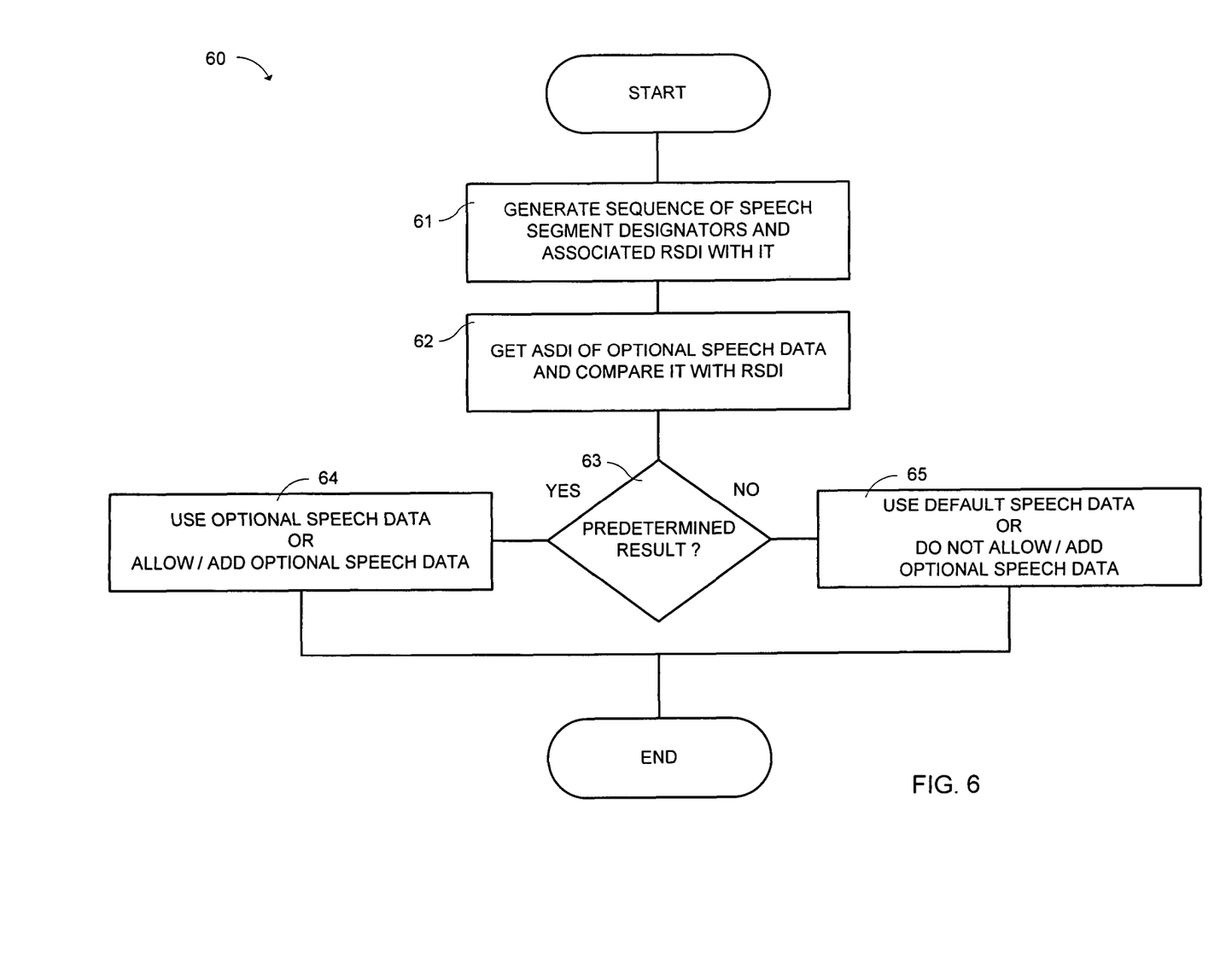
FIG. 6 is a flowchart of a method for outputting speech.

The available optional speech data are accessed and their actual-speech-data-identifier (ASDI) is retrieved and compared with the RSDI 62. It is then determined whether the comparison yields a predetermined result 63. If the comparison renders a predetermined result, the optional speech data may be used 64. However, if the comparison does not yield a predetermined result, the default speech data may be used 65. The predetermined result for may include that the root identifier in the RSDI is the same as one of the root identifiers in the ASDI. The predetermined result may alternately or additionally include that the version identifier in the ASDI is equal to or higher than the version identifier in the RSDI. The optional speech data may include a composition lists as described above. The default speech data may also or alternately include a composition list, but may not necessarily include an ASDI.

Comparing the ASDI with the RSDI 62 may be performed each time speech is to be synthesized. It may also be performed once during installation of the optional speech data. Alternately, the comparison of ASDI and RSDI may be made when adopting or adding certain optional speech data to a list of available speech data. In this case, the optional speech data are inputted to the application via download, data carrier insertion or similar manner. The application accesses the ASDI from the inputted optional speech data and compares the ASDI with the RSDI. When the comparison of ASDI and RSDI renders a predetermined result, the inputted optional speech data may be added to a list of available speech data 6. If the comparison does not render a predetermined result, the inputted optional speech data is not added. For example, the default speech data may include male and female speech data, and optional speech data, such as that of a famous person like John Wayne and/or Rudolf Scharping (a former German defense minister) may be added. After the comparison yields the predetermined result (showing that the inputted optional speech data may be used together with the application) it is not necessary to add an immediate step of synthesizing speech to verify compatibility. Rather, the optional speech data may be adopted into a list of available speech data and may be copied to an appropriate storage location. Alternatively, the RSDI need not be delivered in association with a sequence of segment designators, but may be given and used independently therefrom.

The structure of the speech data and a data carrier bearing the speech data is now described. The structure of the speech data includes speech segments associated with segment designators. Examples of segment designators include strings of characters, storage locations, which are known to an application accessing the speech data. The elements representing the speech segments may be sound files at the respective storage locations, or they may be pointers to specific sound files with the sound files being stored elsewhere. Thus, sound data as described in this invention may be a data structure consisting of a plurality of files. The sound data may also include executable applications for properly installing and storing the required components. In addition, the speech data may include an actual-speech-data-identifier structured as described above. The data carrier may also include a storage location storing the identifier.

Instead of being presented in many smaller files, speech data may be assembled into one large file in which individual data entities (for example, data from sound files representing the respective speech segments), are juxtaposed and separated by appropriate separation signs similar to, or in the same manner as, a database with variable content length. The header of such a file may comprise offsets for, or pointers to, the individual speech segment entries in the file. The header may further include the actual-speech-data-identifier, which may include a root identifier and/or a version identifier, as described above.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A method for updating speech data supplied with an application, the method comprising:

generating a sequence of first segment designators that designate at least one first digitized speech segment of first speech data to define speech;

generating a first sequence identifier to identify the sequence of the first segment designators;

providing second data comprising at least one second digitized speech segment, which are designated by at least one second segment designator identified by a second sequence identifier;

comparing with a computer the first sequence identifier with the second sequence identifier to determine compatibility, where the sequence of the first segment designator partially matches the second sequence identifier; and adding the second digitized speech data to the first digitized speech data in memory when the second sequence identifier indicates compatibility with the first sequence identifier.

2. The method of claim 1, where the first sequence identifier is generated by the application.

3. The method of claim 1, includes offering actual speech data for speech output to the application, where the actual speech data comprises a plurality of speech segments associated with the first segment designators, and an actual-speech-data-identifier; and accepting the actual speech data as suitable for speech output in accordance with the result.

4. The method of claim 3, where the second sequence identifier is a required-speech-data-identifier and the required-speech-data-identifier and the actual-speech-data-identifier both include a root identifier and a version identifier.

5. The method of claim 4, where the actual speech data are accepted when the result shows that the version identifier in the required-speech-data-identifier is not larger than the version identifier in the actual-speech-data-identifier.

6. The method of claim 5, where the actual speech data are accepted when the result further shows that the root identifier in the required-speech-data-identifier is the same as that in the actual-speech-data-identifier.

7. The method of claim 5, where the actual speech data comprises a composition list that defines a relationship between at least one segment of other speech data with at least one of the plurality of speech segments of the actual speech data; the root identifier of the actual speech data further comprises the root identifier of the other speech data; the required-speech-data-identifier comprises a root identifier; and comparing the required-speech-data-identifier with the actual-speech-data-identifier to produce a result comprises comparing whether the root identifier of the required-speech-data-identifier is the same as one of the root identifiers of the actual-speech-data-identifier.

8. The method of claim 3, where the actual speech data are provided on a data carrier.

9. The method of claim 3, where the actual speech, data are provided through wireless data transmission.

10. The method of claim 3, where the actual speech data are provided through a network.

11. The method of claim 3, where the actual speech data comprises speech content that is equivalent to that of default speech data.

12. The method of claim 3, where the actual speech data comprises speech content that has acoustical characteristics different from that of default speech data.

* * * * *

UNITED STATES PATENT AND TRADEMARK OFFICE
CERTIFICATE OF CORRECTION

PATENT NO.       : 7,941,795 B2
APPLICATION NO.  : 10/840934
DATED            : May 10, 2011
INVENTOR(S)      : Rußlies et al.

It is certified that error appears in the above-identified patent and that said Letters Patent is hereby corrected as shown below:

On the Title page, Item (73), the Assignee should be changed from "Herman Becker Automotive Systems GmbH, Karlsbad (DE)" to --Harman Becker Automotive Systems GmbH, Karlsbad (DE)--
Column 4, line 31, "from to a user" should be changed to --for a user--
Column 5, line 11, "In addition the map" should be changed to --In addition to the map--
Column 5, lines 14, 17, 57, 58, 59, and Column 6, lines 6-7, "main application" should be changed to --main application 4--
Column 5, line 13, "default speech data module" should be changed to --default speech data module 6--
Column 5, line 48, "optional speech data module 9" should be changed to --optional speech data module 2--
Column 5, line 66, "which as determination" should be changed to --which a determination--
Column 6, line 10, "optional speech data" should be changed to --optional speech data module 2--
Column 6, line 11, "optional speech data 2" should be changed to --optional speech data module 2--
Column 6, line 18 and 19, "speech segments" should be changed to --speech segments 18--
Column 6, lines 46 and 49, "segment designators" should be changed to --segment designators 17--
Column 6, line 47, "optional speech data module 6" should be changed to --optional speech data module 2--
Column 6, line 50, "ouput system" should be changed to --output system 9--
Column 7, line 43, "version identifier 2" should be changed to --version identifier 45--
Column 9, line 3, "segment designator" should be changed to --segment designators--
Column 9, line 62, "FIG. 3B" should be changed to --FIG. 3--
Column 9, line 51, "speech, data" should be changed to --speech data--

Signed and Sealed this
Eighteenth Day of October, 2011

David J. Kappos
*Director of the United States Patent and Trademark Office*